US010084391B2

(12) United States Patent
Xu et al.

(10) Patent No.: US 10,084,391 B2
(45) Date of Patent: Sep. 25, 2018

(54) INVERTER, METHOD AND DEVICE FOR CONTROLLING THE SAME

(71) Applicant: Vertiv Tech Co., Ltd., Shenzhen, Guangdong (CN)

(72) Inventors: Fubin Xu, Guangdong (CN); Yonghui Zhang, Guangdong (CN); Yang Bing, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 0 days.

(21) Appl. No.: 15/662,768

(22) Filed: Jul. 28, 2017

(65) Prior Publication Data

US 2018/0097453 A1 Apr. 5, 2018

(30) Foreign Application Priority Data

Sep. 30, 2016 (CN) .......................... 2016 1 0874665

(51) Int. Cl.
*H02M 7/217* (2006.01)
*H02M 7/219* (2006.01)
(Continued)

(52) U.S. Cl.
CPC ................. *H02M 7/48* (2013.01); *H02J 3/38* (2013.01); *H02J 7/35* (2013.01); *H02M 7/487* (2013.01);
(Continued)

(58) Field of Classification Search
CPC .......... H02M 7/04; H02M 7/797; H02M 7/12; H02M 7/217; H02M 7/219; H02M 7/42;
(Continued)

(56) References Cited

U.S. PATENT DOCUMENTS 8,963,616 B2 2/2015 Degener et al.
2011/0193412 A1* 8/2011 Lacarnoy .............. H02M 7/483
307/75
(Continued)

FOREIGN PATENT DOCUMENTS

EP 2728734 A1 * 5/2014 ............ H02M 7/487
WO WO-2011154506 A2 12/2011

OTHER PUBLICATIONS

Search Report regarding European Patent Application No. 17185098.5, dated Feb. 23, 2018.
(Continued)

*Primary Examiner* — Timothy J Dole
*Assistant Examiner* — Ivan Laboy Andino
(74) *Attorney, Agent, or Firm* — Harness, Dickey & Pierce, P.L.C.

(57) ABSTRACT

An inverter, a method and a device for controlling the inverter are provided, to improve efficiency of the inverter. The inverter includes a three-level active clamped topology including a first and second bus capacitors and an inverter circuit, the inverter circuit includes a first switch transistor to a sixth switch transistor. The inverter further includes a seventh switch transistor and an eighth switch transistor; the seventh switch transistor and the eighth switch transistor are connected in series between the positive direct current bus and the negative direct current bus in a same direction, and a serial point of the seventh switch transistor and the eighth switch transistor is connected to a serial point of the second switch transistor and the third switch transistor; and the seventh switch transistor and the eighth switch transistor are anti-parallel connected to corresponding diodes respectively.

10 Claims, 13 Drawing Sheets

(51) Int. Cl.
   *H02M 7/487*  (2007.01)
   *H02M 7/5387* (2007.01)
   *H02M 7/5388* (2007.01)
   *H02M 7/48*   (2007.01)
   *H02J 3/38*   (2006.01)
   *H02J 7/35*   (2006.01)
   *H02P 6/04*   (2016.01)
   *H02P 27/06*  (2006.01)
   *H02M 1/00*   (2006.01)

(52) U.S. Cl.
   CPC ............ *H02M 7/5387* (2013.01); *H02P 6/04* (2013.01); *H02P 27/06* (2013.01); *H02M 7/217* (2013.01); *H02M 7/219* (2013.01); *H02M 7/5388* (2013.01); *H02M 2001/0054* (2013.01)

(58) Field of Classification Search
   CPC .......... H02M 7/44; H02M 7/48; H02M 7/483; H02M 7/487; H02M 7/537; H02M 7/5387; H02M 7/5388
   See application file for complete search history.

(56) References Cited

U.S. PATENT DOCUMENTS

| | | | | |
|---|---|---|---|---|
| 2012/0033474 A1* | 2/2012 | Temesi | ................... | H02M 7/483 363/131 |
| 2013/0154716 A1* | 6/2013 | Degener | ............... | H02M 7/487 327/424 |
| 2013/0272045 A1* | 10/2013 | Soeiro | .................. | H02M 7/537 363/131 |
| 2015/0188452 A1* | 7/2015 | Herzer | ................. | H02M 7/487 363/131 |

OTHER PUBLICATIONS

Thiago B. Soeiro et al. "Novel 3-level Hybrid Neutral-Point-Clamped Converter." 37th Annual Conference on IEEE Industrial Electronics Society. Nov. 7, 2011. pp. 4457-4462.

* cited by examiner

INVERTER, METHOD AND DEVICE FOR CONTROLLING THE SAME

This application claims the benefit and priority of Chinese Application No. 201610874665.4, filed on Sep. 30, 2016, the entire disclosure of which is incorporated herein by reference.

FIELD

The present disclosure relates to the technical field of power electronics, and in particular to an inverter, a method and a device for controlling the inverter.

BACKGROUND

With continuous development of the power electronics technology, Pulse Width Modulation (PWM) has gradually become a mainstream control manner for a power electronic converter, and is increasingly widely applied to Uninterruptible Power Supply (UPS), a photovoltaic inverter, a wind energy converter and a motor converter.

Inverters may be classified into a two-level inverter, a three-level inverter, a five-level inverter and a multi-level inverter, in terms of the number of levels of a phase voltage outputted by a PWM modulation inverter. The five-level inverter and the multi-level inverter are more difficult to be implemented due to their complexity. Presently, the two-level inverter and the three-level inverter are mainly used in an industry.

The two-level inverter is easier to be implemented and has a lower cost, but a switch device with a high voltage resistant level needs to be selected since the switch device is to bear a whole bus voltage stress. A switch loss of the two-level inverter is greater, thereby limiting improving of a PWM switch frequency. Harmonic contents of an output voltage are high in the two-level inverter, resulting in a greater volume and loss of an output filter.

Output levels of the three-level inverter are more than that of the two-level inverter, and a voltage stress born by the switch device in the three-level inverter is a half of that of the two-level inverter, therefore a switch device with a lower voltage resistant level may be selected. A switch loss of the switch transistor is lower, harmonic contents of the output voltage are lower than that in the two-level inverter, therefore the volume of the output filter may be reduced.

A common three-level topology is a conventional diode 3 Level-Neutral Point Clamped (3L-NPC) topology, a schematic structural diagram of which is shown in FIG. 1. As shown in FIG. 1, the diode 3L-NPC topology includes: a first bus capacitor C1, a second bus capacitor C2 and an inverter circuit. The C1 and C2 are connected in series between a positive direct current bus and a negative direct current bus, and a serial point of the C1 and C2 is grounded. The inverter circuit includes a first switch transistor S1, a second switch transistor S2, a third switch transistor S3 and a fourth switch transistor S4, and the S1, S2, S3 and S4 are sequentially connected in series between the positive direct current bus and the negative direct current bus in a same direction. Further, each of the switch transistors S1, S2, S3 and S4 is anti-parallel connected to a diode, i.e., a first diode D1, a second diode D2, a third diode D3 and a fourth diode D4 respectively. The inverter circuit further includes a fifth diode D5 and a sixth diode D6. The D5 and D6 are connected in series in a same direction, one terminal of series-connected D5 and D6 is connected to a serial point of S1 and S2, the other terminal is connected to a serial point of S3 and S4, and a serial point of the D5 and D6 is connected to a serial point of the C1 and C2. The diode 3L-NPC topology further includes a filtering circuit. The filtering circuit may include an inductor and a capacitor connected in series, one terminal of the filtering circuit may be connected to a serial point of the S2 and S3, and the other terminal of the filtering circuit is grounded.

Due to existence of the clamped diode and an internal clamped switch device, each phase of circuit may output three levels, i.e., Vdc/2, 0, −Vdc/2 (wherein Vdc is a direct current bus voltage), and a line voltage may obtain an output voltage of 5 levels. For example, when the switch transistors S1 and S2 are turned on, the diode 3L-NPC topology may output a level of Vdc/2 (as shown in FIG. 2(a), a thick line indicates that the line is turned on); when the switch transistors S2 and S3 are turned on, the diode 3L-NPC topology may output a level of 0 (as shown in FIG. 2(b)); and when the switch transistors S3 and S4 are turned on, the diode 3L-NPC topology may output a level of −Vdc/2 (as shown in FIG. 2(c)). Therefore, the switch transistors S1 and S4 mainly bear switch losses, and S2 and S3 mainly bear turned-on losses.

That is, from FIG. 2(a), FIG. 2(b) and FIG. 2(c), the 3L-NPC topology has a unique zero level switch state; based on a direction of a load current, when the current direction is positive, the current can flow only through the switch transistor S2 and the diode D5 on the middle of the upper side; and when the current direction is negative, the current can flow only through the switch transistor S3 and the diode D6 on the lower side. The direction of the current outputted by a middle point of a bridge arm is uniquely determined by the load current, therefore the current is uncontrollable when the zero level is outputted, thereby resulting in unbalance of losses of power devices.

In addition, when a level of Vdc/2 is outputted, the switch transistors S3 and the switch transistor S4 are connected in series to bear the whole bus voltage. Due to device difference or other factors, the two switch devices generally have non-uniform voltages, thereby resulting in that one switch device bears a bus voltage higher than Vdc/2 or much higher, and an over-voltage damage may be caused when a voltage across the device is too high in a severe case.

In order to solve the above problems, active controllable devices, i.e., a fifth switch transistor S5 and a sixth switch transistor S6, may be connected in parallel to the clamped diodes D5 and D6 in the conventional 3L-NPC topology circuit respectively, to form a 3 Level-Active Neutral Point Clamped (3L-ANPC) topology shown in FIG. 3. The topology can completely solve the problem of loss unbalance and non-uniform voltage of the power devices in the diode multi-level-neutral point clamped topology.

In practice, it is found by the applicant that, although the 3L-NPC topology and the 3L-ANPC topology have been widely applied in the field of power electronics, the switch loss and an on-state loss of the switch devices thereof are great, therefore efficiency is not high. In view of this, it is still a critical technical problem that how to improve efficiency of the three-level inverter.

SUMMARY

An inverter, a method and a device for controlling the inverter are provided according to embodiments of the present disclosure, so as to improve efficiency of the inverter.

In a first aspect, an inverter is provided according to an embodiment of the present disclosure, which includes a three-level active clamped topology, where the three-level active clamped topology includes a first bus capacitor, a second bus capacitor and an inverter circuit; the first bus capacitor and the second bus capacitor are connected in series between a positive direct current bus and a negative direct current bus and a serial point of the first bus capacitor and the second bus capacitor is grounded; the inverter circuit includes a first switch transistor, a second switch transistor, a third switch transistor, a fourth switch transistor, a fifth switch transistor and a sixth switch transistor; the first switch transistor, the second switch transistor, the third switch transistor and the fourth switch transistor are sequentially connected in series between the positive direct current bus and the negative direct current bus in a same direction; the fifth switch transistor and the sixth switch transistor are connected in series to each other in a same direction, a non-control terminal in the fifth switch transistor not connected to the sixth switch transistor is connected to a serial point of the first switch transistor and the second switch transistor, a non-control terminal in the sixth switch transistor not connected to the fifth switch transistor is connected to a serial point of the third switch transistor and the fourth switch transistor, a serial point of the fifth switch transistor and the sixth switch transistor is connected to the serial point of the first bus capacitor and the second bus capacitor, and each of the switch transistors is anti-parallel connected to a corresponding diode; and where the inverter further includes:

a seventh switch transistor, an eighth switch transistor, a diode corresponding to the seventh switch transistor and a diode corresponding to the eighth transistor;

the seventh switch transistor and the eighth switch transistor are connected in series between the positive direct current bus and the negative direct current bus in a same direction, and a serial point of the seventh switch transistor and the eighth switch transistor is connected to a serial point of the second switch transistor and the third switch transistor; and the seventh switch transistor and the eighth switch transistor are anti-parallel connected to the corresponding diodes respectively.

Optionally, each of the switch transistors may be a thyristor, an Insulated Gate Bipolar Transistor (IGBT) or a Metal-Oxide-Semiconductor (MOS) transistor.

In another aspect, a method for controlling the inverter described above is provided according to an embodiment of the present disclosure, which includes:

for a positive half cycle of each output voltage, controlling the first switch transistor, the second switch transistor and the sixth switch transistor to be turned on when a first time instant of the positive half cycle of the output voltage comes, and controlling the seventh switch transistor to be turned on when the first switch transistor is completely turned on; and controlling the seventh switch transistor to be turned off when a second time instant of the positive half cycle of the output voltage comes, and controlling the first switch transistor to be turned off when the seventh switch transistor is completely turned off; and for a negative half cycle of each output voltage, controlling the third switch transistor, the fourth switch transistor and the fifth switch transistor to be turned on when a first time instant of the negative half cycle of the output voltage comes, and controlling the eighth switch transistor to be turned on when the fourth switch transistor is completely turned on; and controlling the eighth switch transistor to be turned off when a second time instant of the negative half cycle of the output voltage comes, and controlling the fourth switch transistor to be turned off when the eighth switch transistor is completely turned off, where the first time instant of the positive half cycle of the output voltage is an n-th intersection time instant of a positive half wave of a modulation wave and a carrier wave; the second time instant of the positive half cycle of the output voltage is a time instant which is a first duration earlier than an (n+1)-th intersection time instant of the positive half wave of the modulation wave and the carrier wave; the first time instant of the negative half cycle of the output voltage is an n-th intersection time instant of a negative half wave of the modulation wave and the carrier wave; the second time instant of the negative half cycle of the output voltage is a time instant which is a second duration earlier than an (n+1)-th intersection time instant of the negative half wave of the modulation wave and the carrier wave, where n is an odd number greater than or equal to 1, the first duration is not less than a turned-off duration of the seventh switch transistor, and the second duration is not less than a turned-off duration of the eighth switch transistor.

In another aspect, a method for controlling the inverter described above is further provided according to an embodiment of the present disclosure, which includes:

determining a currently required operation mode of the inverter;

searching operation states of the switch transistors in the inverter corresponding to the determined operation mode, from a correspondence between operation modes of the inverter and operation states of the switch transistors in the inverter; and controlling the operation states of the switch transistors in the inverter according to the searched operation states of the switch transistors in the inverter, where the correspondence between the operation modes of the inverter and the operation states of the switch transistors in the inverter comprises:

in a two-level mode, the first switch transistor, the second switch transistor, the third switch transistor, the fourth switch transistor, the fifth switch transistor and the sixth switch transistor are in a non-operation state, and the seventh switch transistor and the eighth switch transistor are in an operation state;

in a T-type three-level mode, the first switch transistor and the fourth switch transistor are in a non-operation state, and the second switch transistor, the third switch transistor, the fifth switch transistor, the sixth switch transistor, the seventh switch transistor and the eighth switch transistor are in an operation state;

in a three-level active clamped mode, the first switch transistor, the second switch transistor, the third switch transistor, the fourth switch transistor, the fifth switch transistor and the sixth switch transistor are in an operation state, and the seventh switch transistor and the eighth switch transistor are in a non-operation state; and in a mixed mode of the three-level active clamped mode and the T-type three-level mode, the first switch transistor, the second switch transistor, the third switch transistor, the fourth switch transistor, the fifth switch transistor, the sixth switch transistor, the seventh switch transistor and the eighth switch transistor are in an operation state.

Optionally, in a case that the determined operation mode is the three-level active clamped mode, the method may further include:

determining an output load of the inverter; and controlling the switch transistors by a modulation mode which is capable of achieving frequency multiplication of an output voltage, if the determined output load is not greater than a set threshold; and controlling the switch transistors by other modulation mode if the determined output load is greater than the set threshold.

The modulation mode which is capable of achieving frequency multiplication of the output voltage may be a Double-Frequency Sinusoidal Pulse Width Modulation (DF-SPWM) or a Parallel-Freewheeling Double-Frequency Sinusoidal Pulse Width Modulation (PFDF-SPWM) mode.

The other modulation mode may be a Sinusoidal Pulse Width Modulation (SPWM) or a Parallel-Freewheeling Sinusoidal Pulse Width Modulation (PF-SPWM) mode.

In another aspect, a device for controlling the inverter described above is further provided according to an embodiment of the present disclosure, which includes:

a first control module configured to, for a positive half cycle of each output voltage, control the first switch transistor, the second switch transistor and the sixth switch transistor to be turned on when a first time instant of a positive half cycle of the output voltage comes, and control the seventh switch transistor to be turned on when the first switch transistor is completely turned on; and control the seventh switch transistor to be turned off when a second time instant of the positive half cycle of the output voltage comes, and control the first switch transistor to be turned off when the seventh switch transistor is completely turned off, where the first time instant of the positive half cycle of the output voltage is an n-th intersection time instant of a positive half wave of a modulation wave and a carrier wave, the second time instant of the positive half cycle of the output voltage is a time instant which is a first duration earlier than an (n+1)-th intersection time instant of the positive half wave of the modulation wave and the carrier wave, and the first duration is not less than a turned-off duration of the seventh switch transistor; and a second control module configured to, for a negative half cycle of each output voltage, control the third switch transistor, the fourth switch transistor and the fifth switch transistor to be turned on when a first time instant of a negative half cycle of the output voltage comes, and control the eighth switch transistor to be turned on when the fourth switch transistor is completely turned on; and control the eighth switch transistor to be turned off when a second time instant of the negative half cycle of the output voltage comes, and control the fourth switch transistor to be turned off when the eighth switch transistor is completely turned off, where the first time instant of the negative half cycle of the output voltage is an n-th intersection time instant of a negative half wave of the modulation wave and the carrier wave, the second time instant of the negative half cycle of the output voltage is a time instant which is a second duration earlier than an (n+1)-th intersection time instant of the negative half wave of the modulation wave and the carrier wave, the second duration is not less than a turned-off duration of the eighth switch transistor, where n is an odd number greater than or equal to 1.

In another aspect, a device for controlling the inverter described above is further provided according to an embodiment of the present disclosure, which includes:

an operation mode determining module configured to determine a currently required operation mode of the inverter;

a searching module configured to search operation states of the switch transistors in the inverter corresponding to the determined operation mode, from a correspondence between operation modes of the inverter and operation states of the switch transistors in the inverter; and a first control module configured to control the operation states of the switch transistors in the inverter according to the searched operation states of the switch transistors in the inverter, where the correspondence between the operation modes of the inverter and the operation states of the switch transistors in the inverter includes:

in a two-level mode, the first switch transistor, the second switch transistor, the third switch transistor, the fourth switch transistor, the fifth switch transistor and the sixth switch transistor are in a non-operation state, and the seventh switch transistor and the eighth switch transistor are in an operation state;

in a T-type three-level mode, the first switch transistor and the fourth switch transistor are in a non-operation state, and the second switch transistor, the third switch transistor, the fifth switch transistor, the sixth switch transistor, the seventh switch transistor and the eighth switch transistor are in an operation state;

in a three-level active clamped mode, the first switch transistor, the second switch transistor, the third switch transistor, the fourth switch transistor, the fifth switch transistor and the sixth switch transistor are in an operation state, and the seventh switch transistor and the eighth switch transistor are in a non-operation state; and in a mixed mode of the three-level active clamped mode and the T-type three-level mode, the first switch transistor, the second switch transistor, the third switch transistor, the fourth switch transistor, the fifth switch transistor, the sixth switch transistor, the seventh switch transistor and the eighth switch transistor are in an operation state.

Optionally, the device may further include:

an output load determining module configured to determine an output load of the inverter in a case that the operation mode determined by the operation mode determining module is the three-level active clamped mode; and a second control module configured to control the switch transistors by a modulation mode which is capable of achieving frequency multiplication of an output voltage if the determined output load is not greater than a set threshold; and control the switch transistors by other modulation mode if the determined output load is greater than the set threshold.

Beneficial effects of the present disclosure include:

in the inverter according to the embodiment of the present disclosure, two switch transistors are added based on the three-level active clamped topology, the two switch transistors are connected in series between a positive direct current bus and a negative direct current bus in a same direction, and a serial point of the two switch transistors is connected to a serial point of the second switch transistor and the third switch transistor, i.e., a middle point of a bridge arm in the three-level active clamped topology. In the inverter with such structure, the switch transistors are controlled reasonably to be turned off or turned on at time instants, such that the inverter with such structure has advantages of both a low on-state loss of the two-level inverter and a low switch loss of the three-level inverter, thereby effectively reducing the switch loss and the on-state loss of the power devices and improving efficiency of the inverter.

BRIEF DESCRIPTION OF THE DRAWINGS

Drawings are used to provide further understanding for the present disclosure and form a part of the specification. The drawings are used to explain the present disclosure together with embodiments of the present disclosure, and are not intended to limit the present disclosure. In which.

DETAILED DESCRIPTION OF EMBODIMENTS

In order to provide a solution for improving efficiency of an inverter, an inverter, a method and a device for controlling the inverter are provided according to embodiments of the present disclosure. Hereinafter preferred embodiments of the present disclosure are illustrated in conjunction with drawings of the specification. It should be understood that, the preferred embodiments described here are only used to illustrate and explain the present disclosure and are not intended to limit the present disclosure. The embodiments of the present disclosure and features in the embodiments may be combined with each other without a conflict.

Figure 4:
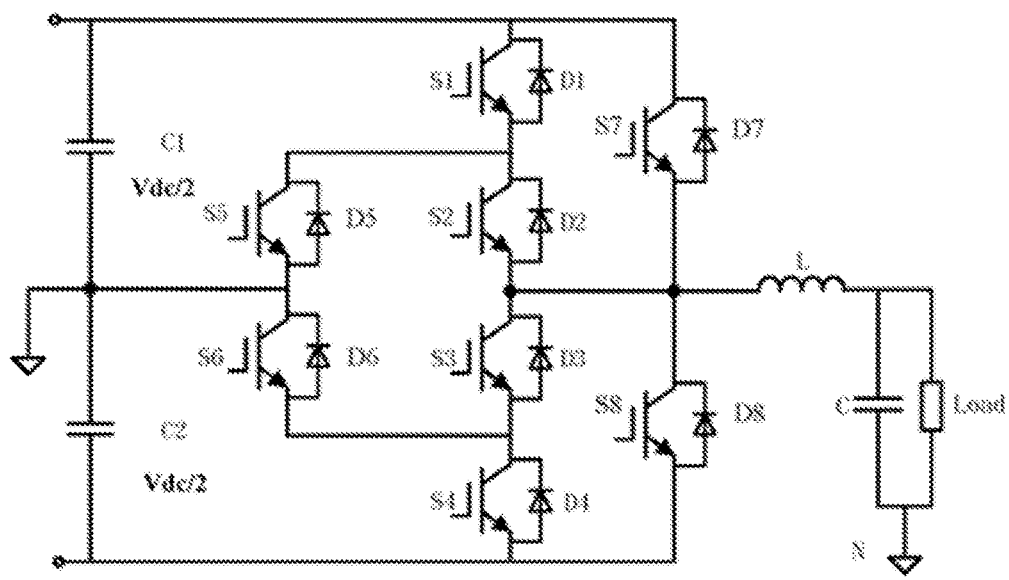
FIG. 4 is a schematic structural diagram of an inverter according to an embodiment of the present disclosure.

FIG. 4 is a schematic structural diagram of an inverter according to an embodiment of the present disclosure. As shown in FIG. 4, the inverter includes: a three-level active clamped topology, a seventh switch transistor S7, an eighth switch transistor S8, a diode D7 corresponding to the seventh switch transistor S7, and a diode D8 corresponding to the eighth switch transistor S8.

The three-level active clamped topology includes: a first bus capacitor C1, a second bus capacitor C2 and an inverter circuit.

The first bus capacitor C1 and the second bus capacitor C2 are connected in series between a positive direct current bus and a negative direct current bus, and a serial point of the first bus capacitor C1 and the second bus capacitor C2 may be grounded.

The inverter circuit includes a first switch transistor S1, a second switch transistor S2, a third switch transistor S3, a fourth switch transistor S4, a fifth switch transistor S5 and a sixth switch transistor S6.

The first switch transistor S1, the second switch transistor S2, the third switch transistor S3 and the fourth switch transistor S4 are sequentially connected in series between the positive direct current bus and the negative direct current bus in a same direction.

The fifth switch transistor S5 and the sixth switch transistor S6 are connected in series to each other in a same direction, a non-control terminal in the fifth switch transistor S5 not connected to the sixth switch transistor S6 is connected to a serial point of the first switch transistor S1 and the second switch transistor S2, a non-control terminal in the sixth switch transistor S6 not connected to the fifth switch transistor S5 is connected to a serial point of the third switch transistor S3 and the fourth switch transistor S4, and a serial point of the fifth switch transistor S5 and the sixth switch transistor S6 is connected to the serial point of the first bus capacitor C1 and the second bus capacitor C2.

The seventh switch transistor S7 and the eighth switch transistor S8 are connected in series between the positive direct current bus and the negative direct current bus in a same direction, and a serial point of the seventh switch transistor S7 and the eighth switch transistor S8 is connected to a serial point of the second switch transistor S2 and the third switch transistor S3.

The first switch transistor S1 is anti-parallel connected to a diode D1, the second switch transistor S2 is anti-parallel connected to a diode D2, the third switch transistor S3 is anti-parallel connected to a diode D3, the fourth switch transistor S4 is anti-parallel connected to a diode D4, the fifth switch transistor S5 is anti-parallel connected to a diode D5, the sixth switch transistor S6 is anti-parallel connected to a diode D6, the seventh switch transistor S7 is anti-parallel connected to a diode D7, and the eighth switch transistor S8 is anti-parallel connected to a diode D8.

Specifically, each of the switch transistors may be any one of a thyristor, an Insulated Gate Bipolar Transistor (IGBT) or a Metal-Oxide-Semiconductor (MOS) transistor.

Optionally, assuming that the switch transistors mentioned above are IGBTs, the first switch transistor S1, the second switch transistor S2, the third switch transistor S3 and the fourth switch transistor S4 being sequentially connected in series between the positive direct current bus and the negative direct current bus in a same direction may include that: a collector (or a drain) of the first switch transistor S1 is connected to the positive direct current bus, and an emitter (or a source) of the first switch transistor S1 is connected to an emitter (or a drain) of the second switch transistor S2; an emitter (or a source) of the second switch transistor S2 is connected to an emitter (or a drain) of the third switch transistor S3; an emitter (or a source) of the third switch transistor S3 is connected to a collector (or a drain) of the fourth switch transistor S4; and an emitter (or a source) of the fourth switch transistor S4 is connected to the negative direct current bus.

The fifth switch transistor S5 and the sixth switch transistor S6 being connected in series to each other in a same direction, the non-control terminal in the fifth switch transistor S5 not connected to the sixth switch transistor S6 being connected to the serial point of the first switch transistor S1 and the second switch transistor S2, and the non-control terminal in the sixth switch transistor S6 not connected to the fifth switch transistor S5 being connected to the serial point of the third switch transistor S3 and the fourth switch transistor S4 may include that: a collector (or a drain) of the fifth switch transistor S5 is connected to the serial point of the first switch transistor S1 and the second switch transistor S2, and an emitter (or a source) of the fifth switch transistor S5 is connected to a collector (or a drain) of the sixth switch transistor S6; and an emitter (or a source) of the sixth switch transistor S6 is connected to a serial point of the third switch transistor S3 and the fourth switch transistor S4.

The seventh switch transistor S7 and the eighth switch transistor S8 being connected in series between the positive direct current bus and the negative direct current bus in a same direction may include that: a collector (or a drain) of the seventh switch transistor S7 is connected to the positive direct current bus, and an emitter (or a source) of the seventh switch transistor S7 is connected to a collector (or a drain) of the eighth switch transistor S8; and an emitter (or a source) of the eighth switch transistor S8 is connected to the negative direct current bus, which is not described in detail here.

Further, it should be noted that, in a case that any of the switch transistors mentioned above is a MOS transistor, a diode anti-parallel connected to the switch transistor may generally be a body diode of the MOS transistor. As can be seen from FIG. 4, the three-level active clamped topology may further include a filtering circuit. The filtering circuit may generally include an inductor L and a capacitor C connected in series, one terminal of the filtering circuit may be connected to a serial point of the seventh switch transistor S7 and the eighth switch transistor S8, and the other terminal of the filtering circuit may be grounded.

It should be noted that, in the inverter shown in FIG. 4, the seventh switch transistor S7 and the eighth switch transistor S8 are directly hooked between a positive electrode and a negative electrode of a power supply, therefore the seventh switch transistor S7 and the eighth switch transistor S8 have high voltage-resistant requirements. The first switch transistor S1 and the second switch transistor S2 are connected to each other and then hooked between the positive electrode and the negative electrode of the power supply, therefore the first switch transistor S1 and the second switch transistor S2 have lower voltage-resistant requirements.

The structure of the inverter according to the embodiment of the present disclosure is described above. Hereinafter a method for controlling the inverter according to an embodiment of the present disclosure is described. There are two control methods in the following.

Figure 5A:
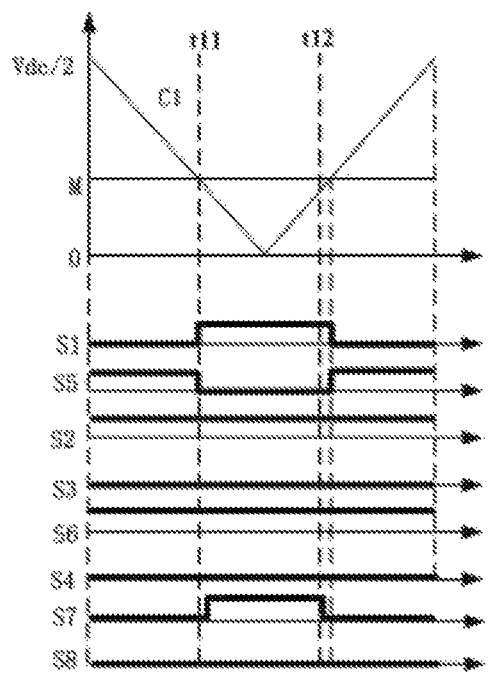
FIG. 5(a) is a first schematic diagram of wave generation of an inverter according to an embodiment of the present disclosure.
Figure 5B:
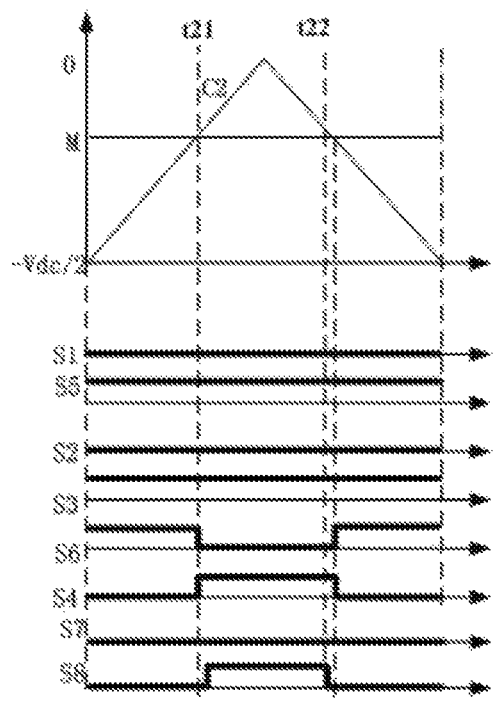
FIG. 5(b) is a second schematic diagram of wave generation of the inverter according to an embodiment of the present disclosure.

First control method: a schematic diagram of wave generation for the first control method may be shown by FIG. 5(a) (corresponding to a positive half cycle of an output voltage) and FIG. 5(b) (corresponding to a negative half cycle of the output voltage).

Specifically, for a positive half cycle of each output voltage (i.e., a positive half cycle of each output voltage of a power supply of the inverter), the first switch transistor S1, the second switch transistor S2 and the sixth switch transistor S6 (the sixth switch transistor S6 and the second switch transistor S2 are synchronous transistors) are controlled to be turned on when a first time instant t11 of the positive half cycle of the output voltage comes, where the first time instant of the positive half cycle of the output voltage is an n-th intersection time instant of a positive half cycle of a modulation wave and a carrier wave, the modulation wave is a wave expected to be outputted, and n is an odd number greater than or equal to 1. At this time, the positive bus voltage charges the inductor L through the first switch transistor S1 and the second switch transistor S2. The sixth switch transistor S6 is turned on, such that both the third switch transistor S3 and the fourth switch transistor S4 are clamped to half of the bus voltage, thereby avoiding non-uniform voltage of the series-connected third switch transistor S3 and fourth switch transistor S4 due to bearing the whole bus voltage.

When the first switch transistor S1 is completely turned on, the seventh switch transistor S7 is controlled to be turned on. At this time, the inverter may operate in a mixed mode of a three-level active clamped I-type mode and a T-type three-level mode. Since both the first switch transistor S1 and the second switch transistor S2 are turned on, a voltage across the seventh switch transistor S7 is zero, the seventh switch transistor S7 is zero-voltage turned on, such that the seventh switch transistor S7 has no turned-on loss. In this way, a problem of a great switch loss of a high voltage device is effectively avoided, thereby achieving a low switch loss.

Figure 1:
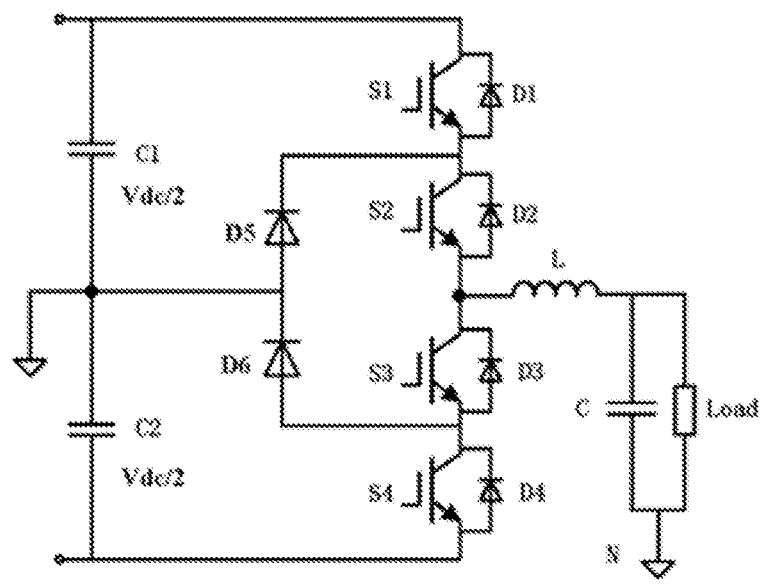
FIG. 1 is a schematic structural diagram of a conventional 3L-NPC topology circuit according to the conventional technology.
Figure 2A:
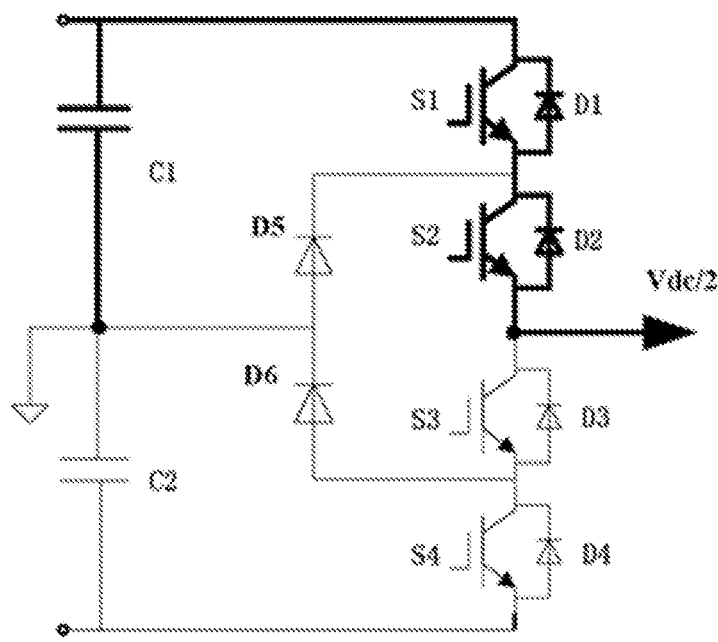
FIG. 2(a) is a first schematic diagram showing switch states of the conventional 3L-NPC topology circuit according to the conventional technology.
Figure 2B:
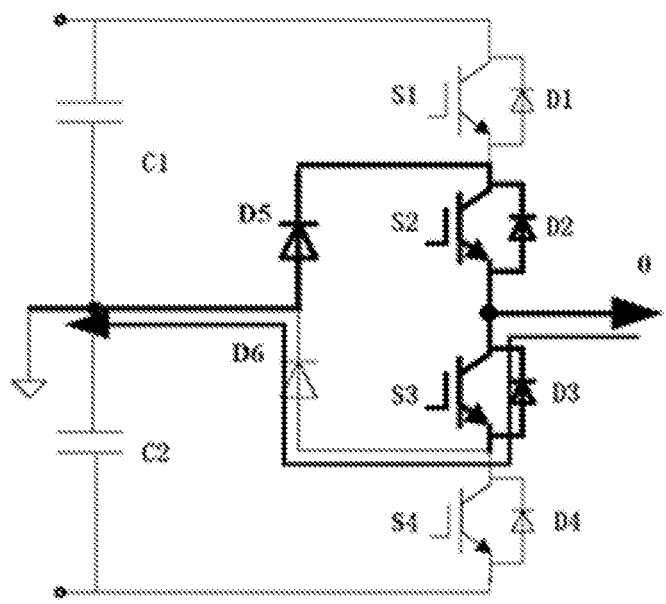
FIG. 2(b) is a second schematic diagram showing switch states of the conventional 3L-NPC topology circuit according to the conventional technology.
Figure 2C:
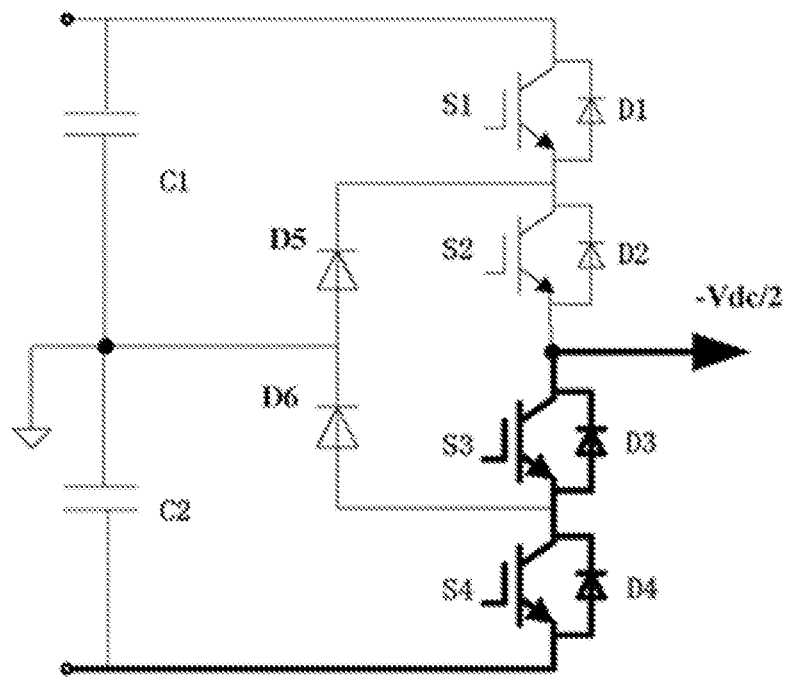
FIG. 2(c) is a third schematic diagram showing switch states of the conventional 3L-NPC topology circuit according to the conventional technology.
Figure 3:
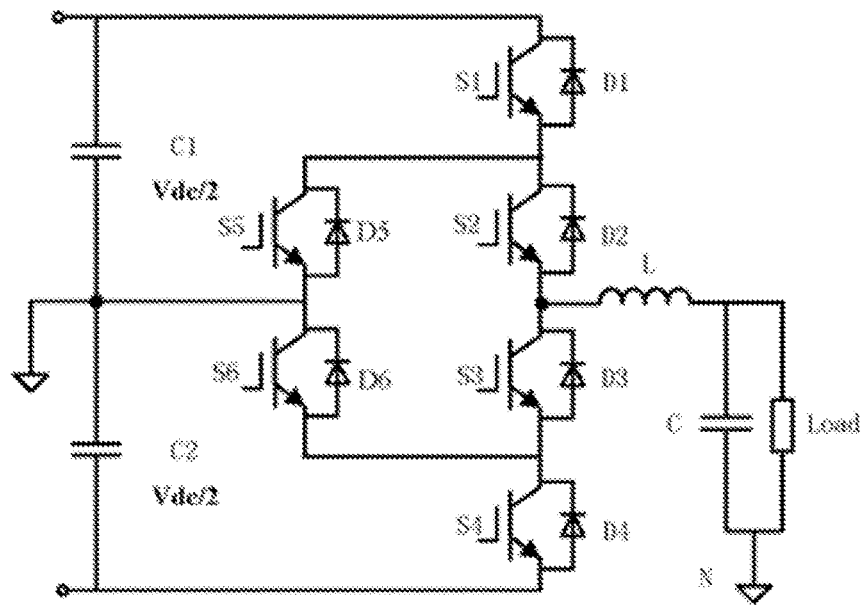
FIG. 3 is a schematic structural diagram of a 3L-ANPC topology circuit according to the conventional technology.

It should be noted that, although the seventh switch transistor S7 and the eighth switch transistor S8 are added in the inverter in FIG. 4, a loss of the circuit is still less than a loss of the switch transistors in FIG. 3. Specifically, for the seventh switch transistor S7, the first switch transistor S1 and the second switch transistor S2 are turned on firstly, the seventh switch transistor S7 is turned on until the first switch transistor S1 is completely turned on, in this way, a total loss of the three transistors in one switch period is equal to a sum of a switch loss of the first switch transistor S1, a switch loss of the second switch transistor S2 and a turned-on loss of the seventh switch transistor S7. In FIG. 3, a total loss of the first switch transistor S1 and the second switch transistor S2 in one switch period is equal to a sum of a switch loss of the first switch transistor S1, a switch loss of the second switch transistor S2, a turned-on loss of the first switch transistor S1 and a turned-on loss of the second switch transistor S2. A turned-on voltage drop of one high voltage device is less than a turned-on voltage drop of two series-connected low voltage devices, that is, a turned-on loss of the seventh switch transistor S7 is less than turned-on losses of the first switch transistor S1 and the second switch transistor S2.

Figure 6:
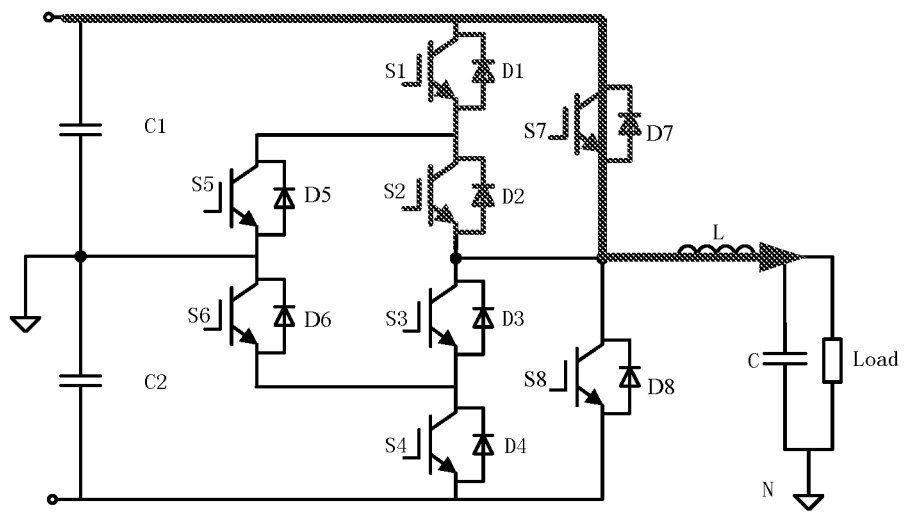
FIG. 6 is a schematic diagram of a Vdc/2 level output mode of an inverter according to an embodiment of the present disclosure.

When the seventh switch transistor S7 is turned on, the first switch transistor S1 is connected in series to the second switch transistor S2 and the series-connected switch transistors are connected in parallel to the seventh switch transistor S7. Since the turned-on voltage drop of the seventh switch transistor S7 is obviously lower than a series-connected voltage of the first switch transistor S1 and the second switch transistor S2, a current does not flow through the first switch transistor S1 and the second switch transistor S2, and the whole current flows through the seventh switch transistor S7, and a direct of the current is shown in FIG. 6. In this way, a disadvantage of a great on-state loss of the low voltage devices, i.e., the first switch transistor S1 and the second switch transistor S2, is effectively overcome, thereby achieving a low on-state loss.

For the positive half cycle of each output voltage, the seventh switch transistor S7 is controlled to be turned off when a second time instant t12 of the positive half period of the output voltage comes, and the first switch transistor S1 is controlled to be turned off when the seventh switch transistor S7 is completely turned off. Since the first switch transistor S1 and the second switch transistor S2 are still turned on when the seventh switch transistor S7 is controlled to be turned off, the seventh switch transistor S7 has no turned-off loss. In this way, a problem of a great switch loss of a high voltage device (i.e., the seventh switch transistor S7) is effectively solved, thereby achieving a low switch loss. The second time instant t12 of the positive half cycle of the output voltage is a time instant which is a first duration earlier than an (n+1)-th intersection time instant of the positive half wave of the modulation wave and the carrier wave, and generally the first duration may not be less than a turned-off duration of the seventh switch transistor S7.

Figure 7:
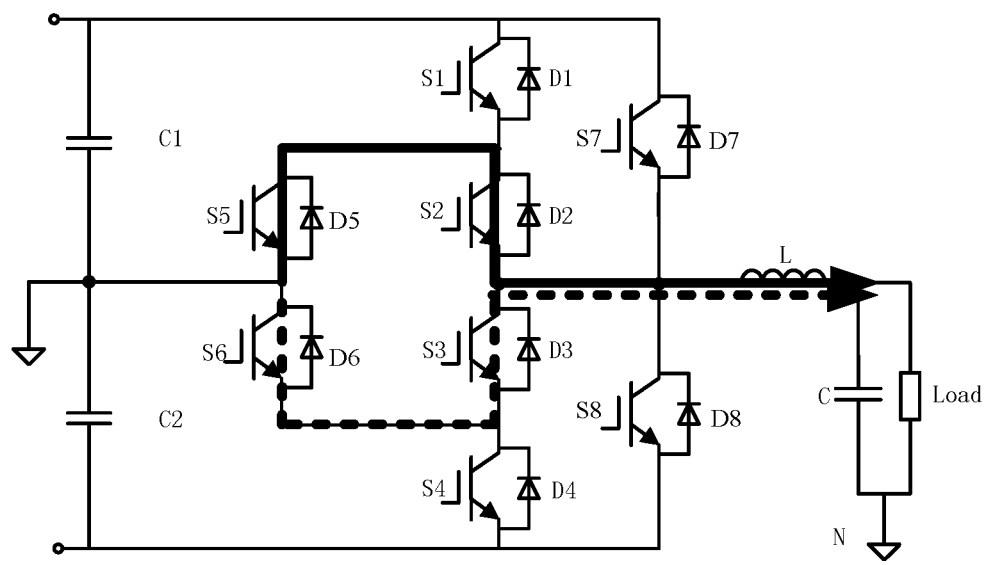
FIG. 7 is a schematic diagram of a zero level output mode of an inverter according to an embodiment of the present disclosure.

The first switch transistor S1 is normally turned-off when the seventh switch transistor S7 is turned off, in this case, a current direction of the inverter is shown in FIG. 7.

For a negative half period of each output voltage (i.e., a negative half cycle of each output voltage of a power supply of the inverter), the third switch transistor S3, the fourth switch transistor S4 and the fifth switch transistor S5 (the fifth switch transistor S5 and the third switch transistor S3 are synchronous transistors) are controlled to be turned on when a first time instant t21 of the negative half cycle of the output voltage comes, where the first time instant t21 of the negative half cycle of the output voltage is an n-th intersection time instant of a negative half wave of a modulation wave and a carrier wave. In this case, the positive bus voltage charges the inductor L through the third switch transistor S3 and the fourth switch transistor S4; the fifth switch transistor S5 is turned on, such that both the first switch transistor S1 and the second switch transistor S2 are clamped to half of the bus voltage, thereby avoiding non-uniform voltage of the series-connected first switch transistor S1 and second switch transistor S2 due to bearing the whole bus voltage.

When the fourth switch transistor S4 is completely turned on, the eighth switch transistor S8 is controlled to be turned on. At this time, the inverter operates in a mixed mode of a three-level active clamped I-type mode and a T-type three level mode. Since both the third switch transistor S3 and the fourth switch transistor S4 are turned on, a voltage across the eighth switch transistor S8 is zero, the eighth switch transistor S8 is zero-voltage turned-on, and the eighth switch transistor S8 has no turned-on loss. In this way, a problem of a great switch loss of a high voltage device is effectively solved, thereby achieving a low switch loss.

It should be noted that, although the seventh switch transistor S7 and the eighth switch transistor S8 are added in the inverter shown in FIG. 4, a loss of the circuit is still less than a loss of the switch transistors in FIG. 3. Specifically, for the eighth switch transistor S8, the third switch transistor S3 and the fourth switch transistor S4 are turned on firstly, the eighth switch transistor S8 is turned on until the fourth switch transistor S4 is completely turned on, in this way, a total loss of the three transistors in one switch period is equal to a sum of a switch loss of S3, a switch loss of the fourth switch transistor S4 and a turned-on loss of the eighth switch transistor S8. In FIG. 3, a total loss of the third switch transistor S3 and the fourth switch transistor S4 in one switch period is equal to a switch loss of the third switch transistor S3, a switch loss of the fourth switch transistor S4, a turned-on loss of the third switch transistor S3 and a turned-on loss of the fourth switch transistor S4. A turned-on voltage drop of one high voltage device is less than a turned-on voltage drop of two series-connected low voltage devices, that is, a turned-on loss of the eighth switch transistor S8 is lower than turned-on losses of the third switch transistor S3 and the fourth switch transistor S4.

When the eighth switch transistor S8 is turned on, the third switch transistor S3 is connected in series to the fourth switch transistor S4, and the series-connected transistors are connected in parallel to the eighth switch transistor S8. Since a turned-on voltage drop of the eighth switch transistor S8 is obviously lower than a series-connected voltage of the third switch transistor S3 and the fourth switch transistor S4, a current does not flow through the third switch transistor S3 and the fourth switch transistor S4, and the whole current flows through the eighth switch transistor S8. Therefore, a disadvantage of a great on-state loss of low voltage devices, i.e., the first switch transistor S1 and the second switch transistor S2 is effectively overcome, thereby achieving a low on-state loss.

For a negative half cycle of each output voltage, the eighth switch transistor S8 is controlled to be turned off when a second time instant t22 of the negative half cycle of the output voltage comes, and the fourth switch transistor S4 is controlled to be turned off when the eighth switch transistor S8 is completely turned off. Since the third switch transistor S3 and the fourth switch transistor S4 are still turned on when the eighth switch transistor S8 is controlled to be turned off, the eighth switch transistor S8 has no turned-off loss. In this way, a problem of a great switch loss of a high voltage device (i.e., the eighth switch transistor S8) is effectively solved, thereby achieving a low switch loss. The second time instant of the negative half cycle of the output voltage is a time instant which is a second duration earlier than an (n+1)-th intersection time instant of the negative half wave of the modulation wave and the carrier wave, and generally the second duration may not be less than a turned-off duration of the eighth switch transistor S8.

According to analysis about the positive half cycle and the negative half cycle of the output voltage, in the inverter according to the present disclosure, the switch transistors are controlled reasonably to be turned off or turned on at the time instants, such that the inverter with such structure has advantages of both a low on-state loss of the two-level inverter and a low switch loss of the three-level inverter, thereby effectively reducing the switch loss and the on-state loss of the power devices and improving efficiency of the inverter.

Figure 8:
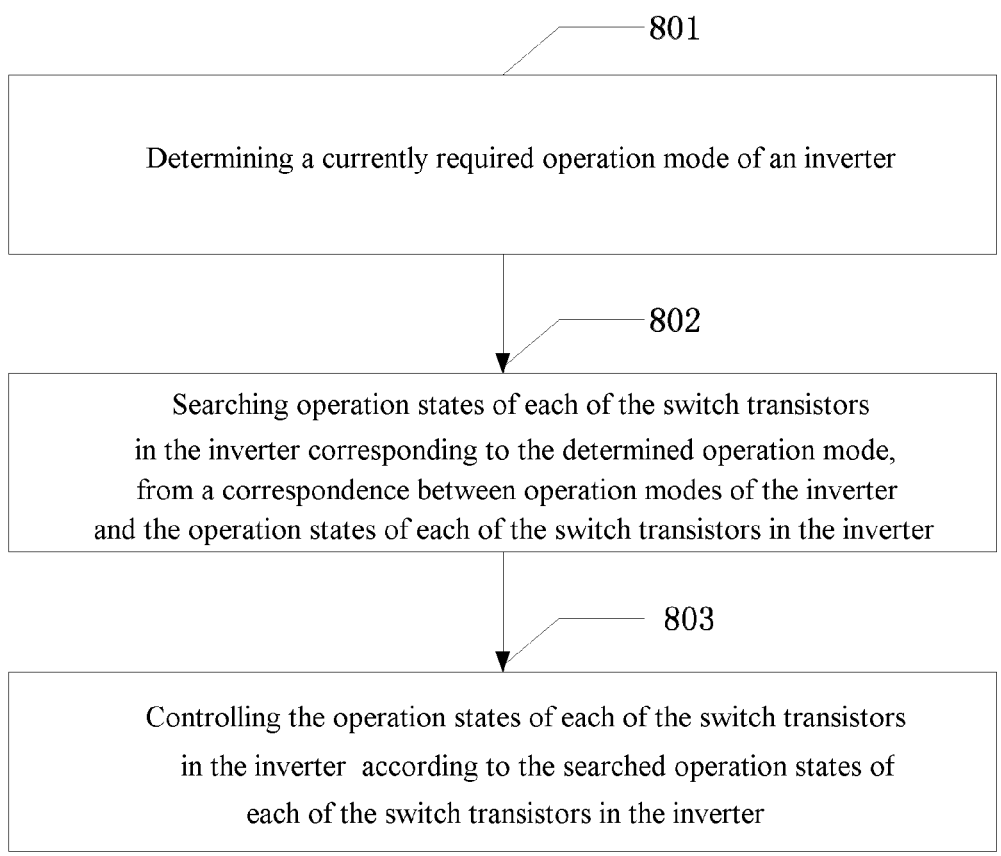
FIG. 8 is a schematic diagram of a method for controlling the inverter according to an embodiment of the present disclosure.

A flowchart of a second control method is shown in FIG. 8. The method includes steps 801 to 803 in the following.

In step 801, a currently required operation mode of an inverter is determined.

Here, an operation mode of the inverter specified by a user instruction received currently may function as the determined currently required operation mode of the inverter.

In step 802, operation states of switch transistors in the inverter corresponding to the determined operation mode are searched from a correspondence between operation modes of the inverter and the operation states of the switch transistors in the inverter.

The correspondence between the operation modes of the inverter and the operation states of the switch transistors in the inverter may include that:

in a two level mode, the first switch transistor, the second switch transistor, the third switch transistor, the fourth switch transistor, the fifth switch transistor and the sixth switch transistor are in a non-operation state, and the seventh switch transistor and the eighth switch transistor are in an operation state;

in a T-type three level mode, the first switch transistor and the fourth switch transistor are in a non-operation state, and the second switch transistor, the third switch transistor, the fifth switch transistor, the sixth switch transistor, the seventh switch transistor and the eighth switch transistor are in an operation state;

in a three-level active clamped mode, the first switch transistor, the second switch transistor, the third switch transistor, the fourth switch transistor, the fifth switch transistor and the sixth switch transistor are in an operation state, and the seventh switch transistor and the eighth switch transistor are in an operation state; and in a mixed mode of the three-level active clamped mode and the T-type three level mode, the first switch transistor, the second switch transistor, the third switch transistor, the fourth switch transistor, the fifth switch transistor, the sixth switch transistor, the seventh switch transistor and the eighth switch transistor are in an operation state.

In step 803, operation states of the switch transistors in the inverter are controlled according to the searched operation states of the switch transistors in the inverter.

Figure 9:
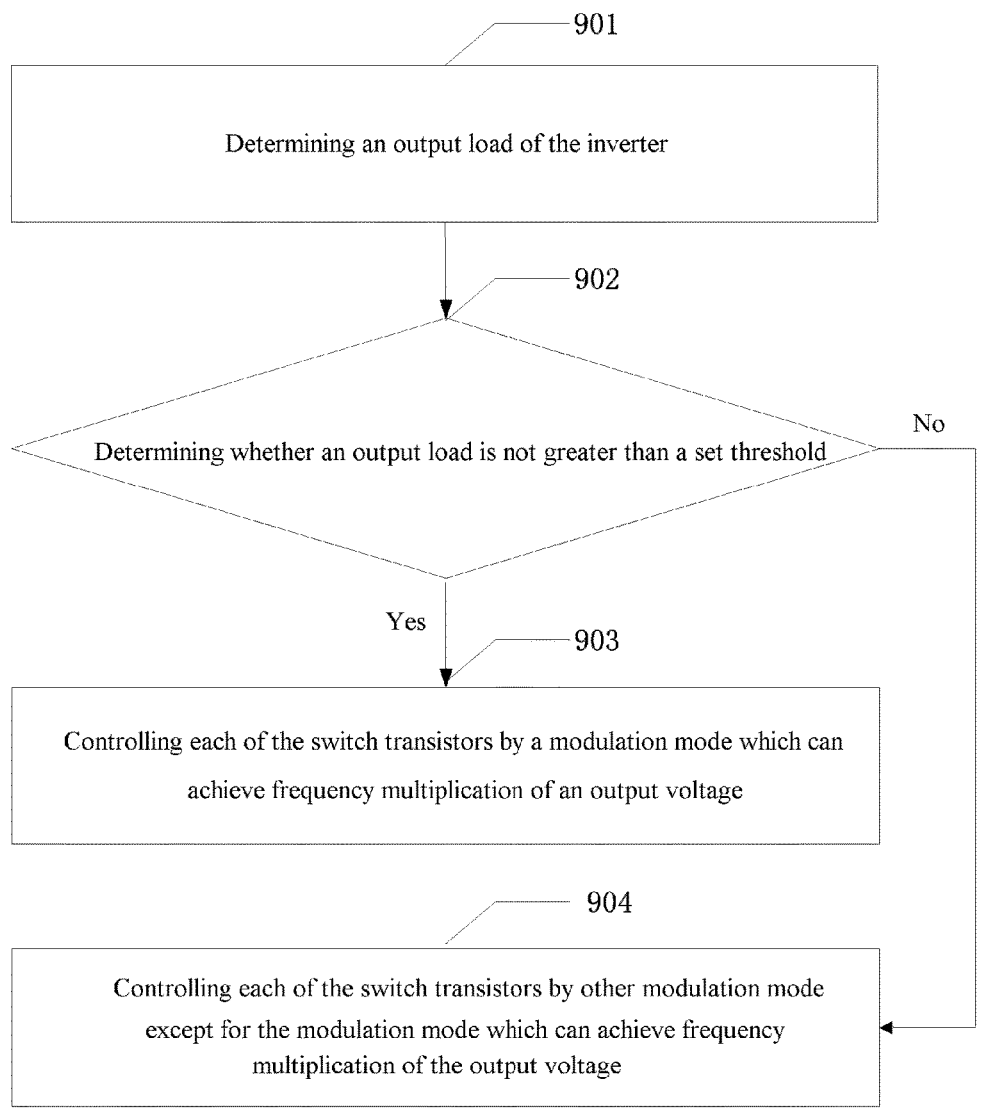
FIG. 9 is a schematic diagram of a method for controlling the inverter operating in a 3L-ANPC mode according to an embodiment of the present disclosure.

Preferably, in order to further improve efficiency of the inverter, in a case that the determined operation mode is the three-level active clamped mode, the second method may further include steps 901 to 904 as shown in FIG. 9.

In step 901, an output load (the Load shown in FIG. 4) of the inverter is determined.

Optionally, a current output load of the inverter may be determined based on a current output voltage and a current output current and so on of the inverter, which is not described in detail here.

In step 902, it is determined whether the output load is greater than a set threshold (the threshold may be flexibly set according to actual cases); step 903 is performed if it is determined that the output load is greater than the set threshold; and step 904 is performed if it is determined that the output load is not greater than the set threshold.

In step 903, the switch transistors are controlled by a modulation mode which can achieve frequency multiplication of an output voltage.

Since the common modulation wave is a sinusoidal wave, the modulation mode which can achieve frequency multiplication of the output voltage may be a Double-Frequency SPWM (DF-SPWM) or a Parallel-Freewheeling & Double-Frequency SPWM (PFDF-SPWM) mode.

In step 904, the switch transistors are controlled by other modulation mode except for the modulation mode which can achieve frequency multiplication of the output voltage.

Since the common modulation wave is a sinusoidal wave, the other modulation mode may be a Sinusoidal PWM (SPWM) or a Parallel-Freewheeling SPWM (PF-SPWM) mode.

Figure 10A:
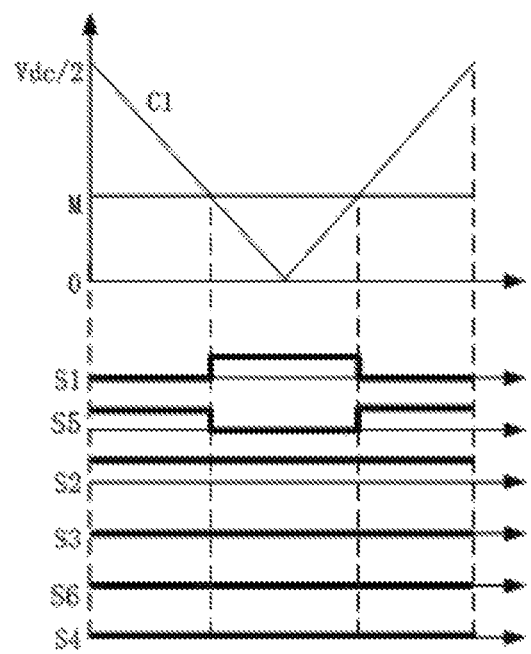
FIG. 10(a) is a first schematic diagram of an SPWM wave generation mode for the 3L-ANPC according to an embodiment of the present disclosure.
Figure 10B:
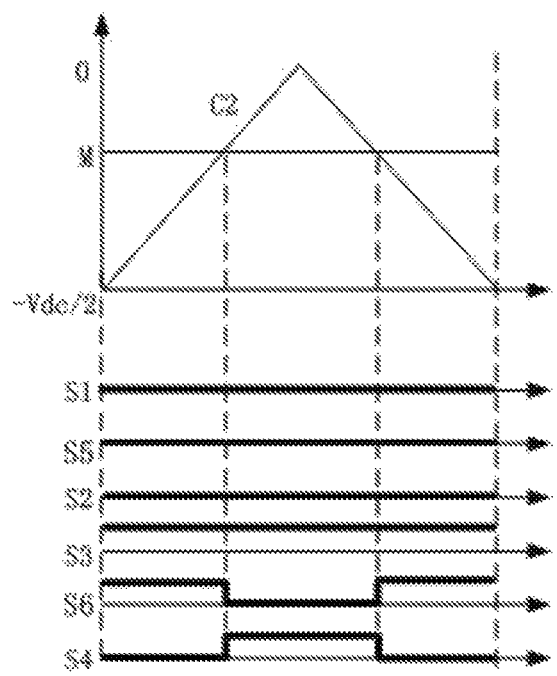
FIG. 10(b) is a second schematic diagram of an SPWM wave generation mode for the 3L-ANPC according to an embodiment of the present disclosure.
Figure 11A:
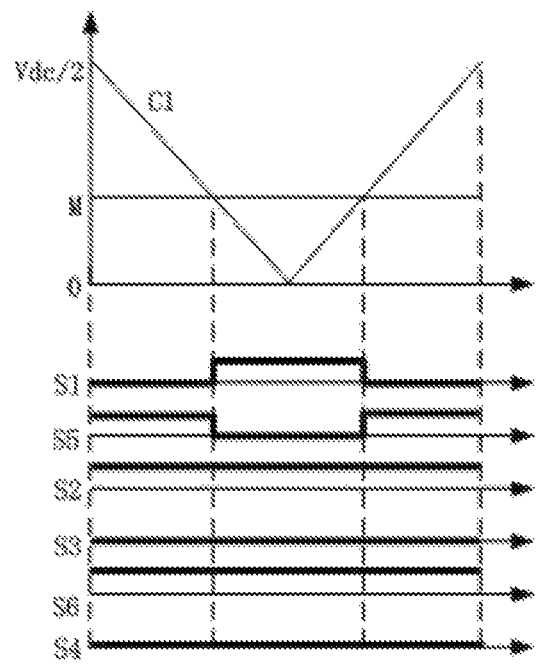
FIG. 11(a) is a first schematic diagram of a PF-SPWM wave generation mode for the 3L-ANPC according to an embodiment of the present disclosure.
Figure 11B:
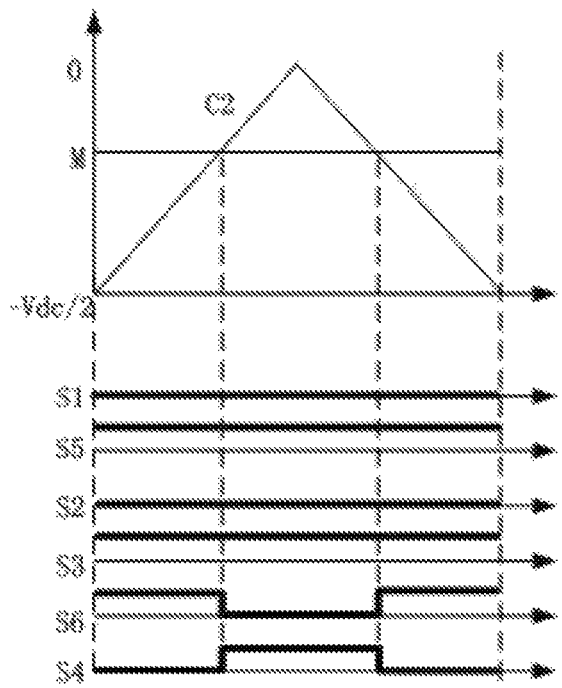
FIG. 11(b) is a second schematic diagram of a PF-SPWM wave generation mode for the 3L-ANPC according to an embodiment of the present disclosure.
Figure 12A:
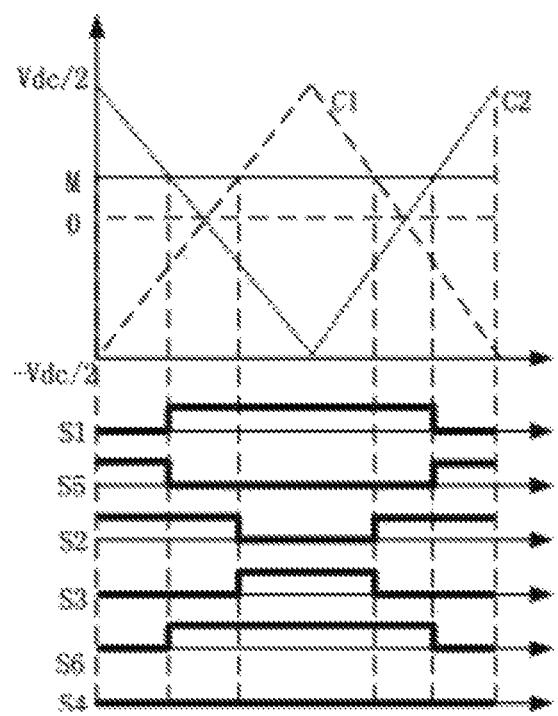
FIG. 12(a) is a first schematic diagram of a DF-SPWM wave generation mode for the 3L-ANPC according to an embodiment of the present disclosure.
Figure 12B:
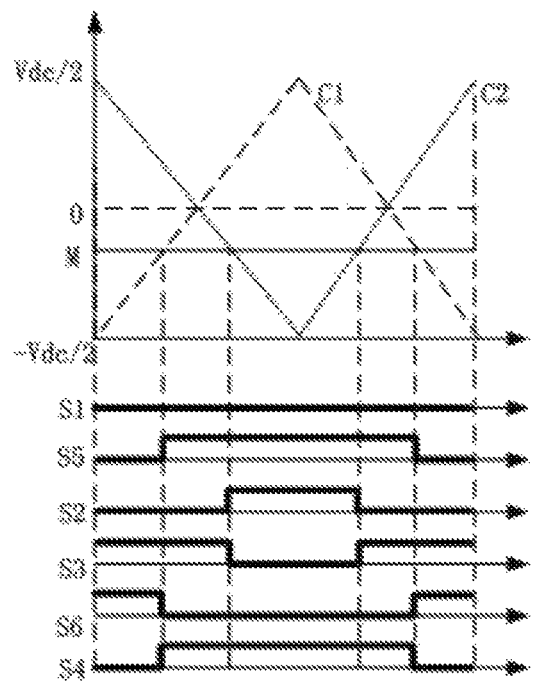
FIG. 12(b) is a second schematic diagram of a DF-SPWM wave generation mode for the 3L-ANPC according to an embodiment of the present disclosure.
Figure 13A:
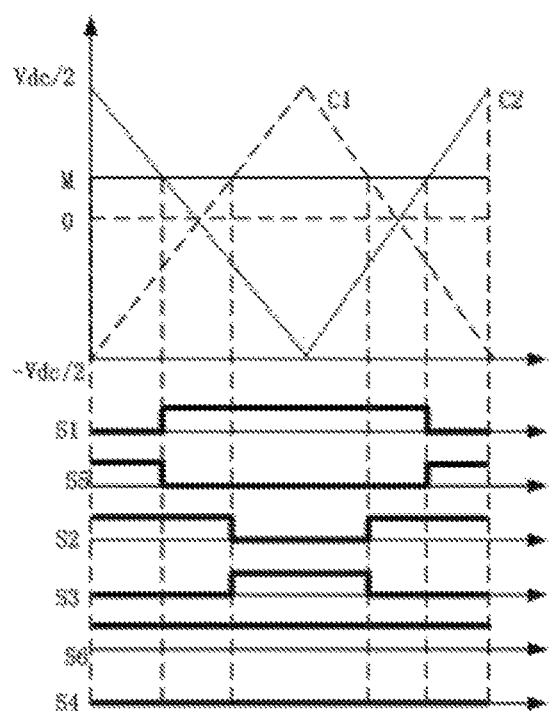
FIG. 13(a) is a first schematic diagram of a PFDF-SPWM wave generation mode for the 3L-ANPC according to an embodiment of the present disclosure.
Figure 13B:
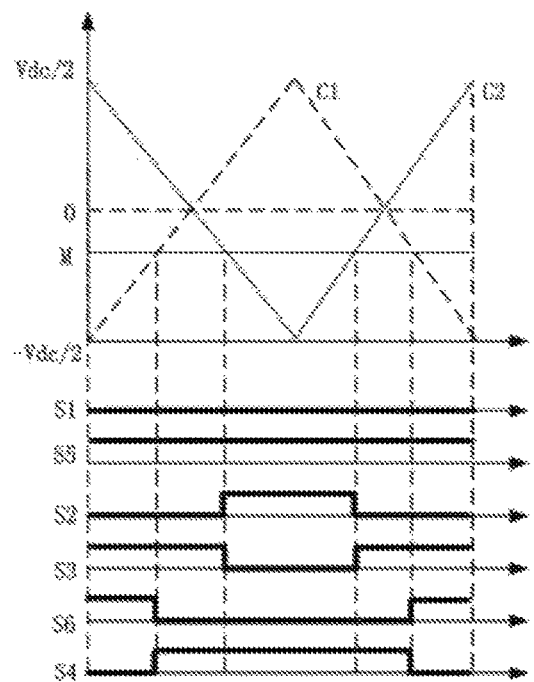
FIG. 13(b) is a second schematic diagram of a PFDF-SPWM wave generation mode for the 3L-ANPC according to an embodiment of the present disclosure.

FIG. 10(a) and FIG. 10(b) show schematic diagrams of SPWM wave generation modes of a positive half cycle and a negative half cycle of an output voltage for the 3L-ANPC respectively; FIG. 11(a) and FIG. 11(b) show schematic diagrams of PF-SPWM wave generation modes of a positive half cycle and a negative half cycle of an output voltage for the 3L-ANPC respectively; FIG. 12(a) and FIG. 12(b) show schematic diagrams of DF-SPWM wave generation modes of a positive half cycle and a negative half cycle of an output voltage for the 3L-ANPC respectively; and FIG. 13(a) and FIG. 13(b) show schematic diagrams of PFDF-SPWM wave generation modes of a positive half cycle and a negative half cycle for the 3L-ANPC respectively, which are not described in detail here.

According to the above contents, in the embodiment of the present disclosure, it may be switched between different modulation modes based on different output loads, the inductor of the inverter can be optimized, frequency multiplication of output of the inverter can be achieved in a case of a low load, and an inductance of the inductor of the inverter is reduced, thereby reducing a volume of the inductor. The turned-on loss and heat distribution of the switch device can be reduced by the double freewheeling loop, thereby improving utilization of the switch transistors and improving conversion efficiency of the inverter.

It is assumed that the modulation mode and the other modulation mode which can achieve frequency multiplication of the output voltage are PFDF-SPWM and PF-SPWM respectively. When the inverter operates in the three-level active clamped mode, different modulation modes are used for different output loads, so as to further improve efficiency of the inverter.

The PF-SPWM modulation mode is used when an output load of the inverter is greater than a set threshold.

Figure 14:
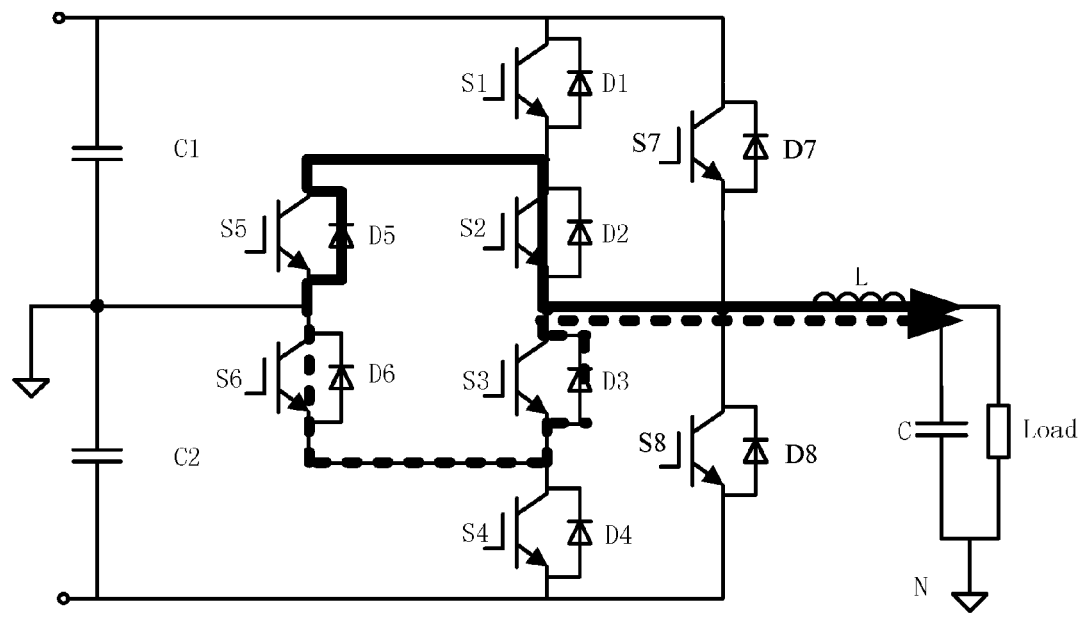
FIG. 14 is a schematic diagram of a double freewheeling circuit for the 3L-ANPC according to an embodiment of the present disclosure.

As shown in FIG. 14, when the PF-SPWM modulation mode is used, there is a double freewheeling loop in the 3L-ANPC circuit, turned-on losses of the third switch transistor S3 and the fifth switch transistor S5 can be reduced significantly, efficiency of the inverter can be improved, and uniform voltage of the series-connected devices can be achieved, that is, the sixth switch transistor S6 is turned on, such that the fourth switch transistor S4 can be clamped to half of the bus voltage at a positive half cycle of the output voltage. Since the second switch transistor S2 and the sixth switch transistor S6 are synchronous transistors, the freewheeling loops are in parallel, and a reverse recovery loss can be reduced by the parallel freewheeling, that is, the efficiency of the inverter is improved.

When the output load of the inverter is lower than a set threshold, the PFDF-SPWM modulation mode is used, the switch loss of the first switch transistor S1 is shared by the second switch transistor S2, the freewheeling loops are separated and independent, there may be a single freewheeling loop or there may be two parallel freewheeling loops, that is, there is parallel freewheeling paths, or the freewheeling path may operate independently. The parallel freewheeling can reduce the turned-on loss, conversion efficiency of the three-level inverter is improved; the parallel freewheeling can distribute the switch loss on average, frequency multiplication of the output voltage can be achieved, such that the conversion efficiency of the three-level inverter can be improved more significantly and the modulation is more flexible. A switch state of the second switch transistor S2 determines branch selection of the freewheeling loop, a part of the switch transistors can be soft-switched, voltage resistant uniform-voltage of the transistors can be achieved, and the inner transistor and the outer transistor each bear half of the switch loss. The reverse recovery loss can be reduced by the parallel freewheeling, thereby further improving the conversion efficiency of the three-level inverter.

In summary, the switch transistors being controlled by drive signals outputted in different modulation modes based on different output loads according to the embodiment of the present disclosure may obtain the following beneficial effects:

1. in a case of inversion, the freewheeling loop changes into parallel connected diodes, that is, providing two freewheeling loops, such that efficiency of the freewheeling loop is improved (a turned-on loss of a bidirectional switch transistor can be reduced), thereby improving the conversion efficiency of the inverter and reducing a type selection cost;

2. the reverse recovery loss of the inverter is reduced and the turned-on loss of the diode is reduced, thereby improving the conversion efficiency of the inverter from another aspect; and 3. frequency multiplication of the output voltage is achieved, thereby optimizing electromagnetic elements greatly and improving utilization of the switch elements.

Figure 15:
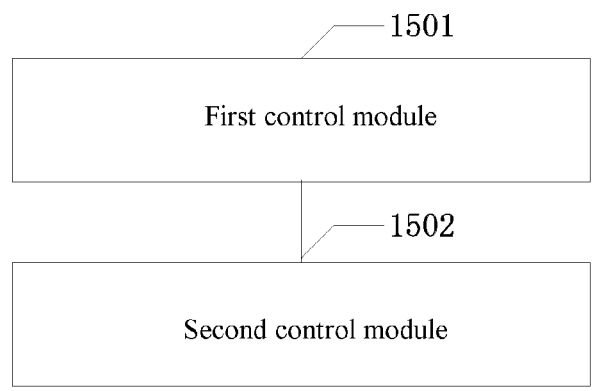
FIG. 15 is a schematic structural diagram of a device for controlling the inverter according to an embodiment of the present disclosure.

Based on the same invention concept as the first control method according to the embodiment of the present disclosure, a device for controlling the inverter is provided according to an embodiment of the present disclosure. For a specific implementation of the device for controlling the inverter, one may refer to related description of the first control method in the embodiment of the present disclosure, which is not described in detail here. FIG. 15 shows a schematic structural diagram of the device for controlling the inverter, and the device includes a first control module 1501 and a second control module 1502.

The first control module 1501 is configured to, for a positive half cycle of each output voltage, control a first switch transistor, a second switch transistor and a sixth switch transistor to be turned on when a first time instant of the positive half cycle of the output voltage comes, and control a seventh switch transistor to be turned on when the first switch transistor is completely turned on; control the seventh switch transistor to be turned off when a second time instant of the positive half cycle of the output voltage comes, and control the first switch transistor to be turned off when the seventh switch transistor is completely turned off. The first time instant of the positive half cycle of the output voltage is an n-th intersection time instant of a positive half cycle of a modulation wave and a carrier wave, the second time instant of the positive half cycle of the output voltage is a time instant which is a first duration earlier than an (n+1)-th intersection time instant of the positive half wave of the modulation wave and the carrier wave, and the first duration is not less than a turned-off duration of the seventh switch transistor.

The second control module 1502 is configured to, for a negative half cycle of each output voltage, control a third switch transistor, a fourth switch transistor and a fifth switch transistor to be turned on when a first time instant of a negative half cycle of the output voltage comes, and control an eighth switch transistor to be turned on when the fourth switch transistor is completely turned on; and control an eighth switch transistor to be turned off when a second time instant of the negative half cycle of the output voltage comes, and control the fourth switch transistor to be turned off when the eighth switch transistor is completely turned off. The first time instant of the negative half cycle of the output voltage is an n-th intersection time instant of a negative half wave of a modulation wave and a carrier wave, the second time instant of the negative half cycle of the output voltage is a time instant which is a second duration earlier than an (n+1)-th intersection time instant of the negative half wave of the modulation wave and the carrier wave, the second duration is not less than a turned-off duration of the eighth switch transistor, and n is an odd number greater than or equal to 1.

Figure 16:
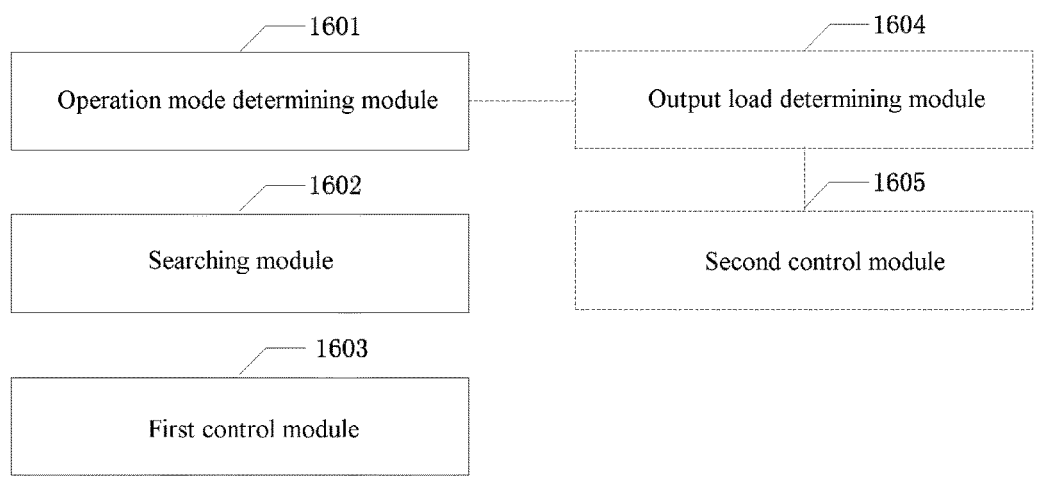
FIG. 16 is a schematic structural diagram of another device for controlling the inverter according to an embodiment of the present disclosure.

Based on the same invention concept as the second control method according to the embodiment of the present disclosure, another device for controlling the inverter is provided according to an embodiment of the present disclosure. For a specific implementation of another device for controlling the inverter, one may refer to the related description of the second control method in the embodiment of the present disclosure, which is not described in detail here. FIG. 16 shows a schematic structural diagram of another device for controlling the inverter, and the device includes an operation mode determining module 1601, a searching module 1602 and a first control module 1603.

The operation mode determining module 1601 is configured to determine a currently required operation mode of the inverter.

The searching module 1602 is configured to search operation states of switch transistors in the inverter corresponding to the determined operation mode, from a correspondence between operation modes of the inverter and the operation states of the switch transistors in the inverter.

The first control module 1603 is configured to control operation states of the switch transistors in the inverter according to the searched operation states of the switch transistors in the inverter. The correspondence between the operation modes of the inverter and the operation states of the switch transistors in the inverter may include that:

in a two-level mode, the first switch transistor, the second switch transistor, the third switch transistor, the fourth switch transistor, the fifth switch transistor and the sixth switch transistor are in a non-operation state, and the seventh switch transistor and the eighth switch transistor are in an operation state;

in a T-type three-level mode, the first switch transistor and the fourth switch transistor are in a non-operation state, and the second switch transistor, the third switch transistor, the fifth transistor, the sixth transistor, the seventh switch transistor and the eighth switch transistor are in an operation state;

in a three-level active clamped mode, the first switch transistor, the second switch transistor, the third switch transistor, the fourth switch transistor, the fifth switch transistor and the sixth switch transistor are in an operation state, and the seventh switch transistor and the eighth switch transistor are in a non-operation state; and in a mixed mode of the three-level active clamped mode and the T-type three-level mode, the first switch transistor, the second switch transistor, the third switch transistor, the fourth switch transistor, the fifth switch transistor, the sixth switch transistor, the seventh switch transistor and the eighth switch transistor are in an operation state.

Preferably, the another device for controlling the inverter further includes an output load determining module 1604 and a second control module 1605.

The output load determining module 1604 is configured to determine an output load of the inverter when the operation mode determined by the operation mode determining module is the three-level active clamped mode.

The second control module 1605 is configured to control switch transistors by a modulation mode which can achieve frequency multiplication of an output voltage if the determined output load is not greater than a set threshold; and control the switch transistors by other modulation mode if the determined output load is greater than the set threshold.

The modulation mode which can achieve frequency multiplication of the output voltage is a DF-SPWM mode or a PFDF-SPWM mode, and the other modulation mode is an SPWM mode or PF-SPWM mode.

In summary, with the inverter and the control method according to the embodiment of the present disclosure, in the inverter with such structure, the switch transistors can be controlled reasonably to be turned off or turned on at time instants, such that the inverter with such structure has advantages of both a low on-state loss of the two-level inverter and a low switch loss of the three-level inverter, thereby effectively reducing the switch loss and the on-state loss of the power devices and improving the efficiency of the inverter.

Obviously, those skilled in the art can make various changes and variations to the present disclosure without departing from the spirit and scope of the present disclosure. If the changes and variations of the present disclosure fall within the scope of claims of the present disclosure and equivalent technology thereof, the present disclosure is intended to include the changes and variations.

The invention claimed is:

1. A device for controlling an inverter,
the inverter including a three-level active clamped topology, wherein the three-level active clamped topology includes a first bus capacitor, a second bus capacitor and an inverter circuit; the first bus capacitor and the second bus capacitor are connected in series between a positive direct current bus and a negative direct current bus and a serial point of the first bus capacitor and the second bus capacitor is grounded; the inverter circuit includes a first switch transistor, a second switch transistor, a third switch transistor, a fourth switch transistor, a fifth switch transistor and a sixth switch transistor; the first switch transistor, the second switch transistor, the third switch transistor and the fourth switch transistor are sequentially connected in series between the positive direct current bus and the negative direct current bus in a same direction; the fifth switch transistor and the sixth switch transistor are connected in series to each other in a same direction, a non-control terminal in the fifth switch transistor not connected to the sixth switch transistor is connected to a serial point of the first switch transistor and the second switch transistor, a non-control terminal in the sixth switch transistor not connected to the fifth switch transistor is connected to a serial point of the third switch transistor and the fourth switch transistor, a serial point of the fifth switch transistor and the sixth switch transistor is connected to the serial point of the first bus capacitor and the second bus capacitor, and each of the switch transistors is anti-parallel connected to a corresponding diode; the inverter further includes a seventh switch transistor, an eighth switch transistor, a diode corresponding to the seventh switch transistor and a diode corresponding to the eighth switch transistor; the seventh switch transistor and the eighth switch transistor are connected in series between the positive direct current bus and the negative direct current bus in a same direction, and a serial point of the seventh switch transistor and the eighth switch transistor is connected to a serial point of the second switch transistor and the third switch transistor; and the seventh switch transistor and the eighth switch transistor are anti-parallel connected to the corresponding diodes respectively, the device comprising:
a first control module configured to:
for a positive half cycle of each output voltage, control the first switch transistor, the second switch transistor and the sixth switch transistor to be turned on when a first time instant of a positive half cycle of the output voltage comes;
control the seventh switch transistor to be turned on when the first switch transistor is completely turned on;
control the seventh switch transistor to be turned off when a second time instant of the positive half cycle of the output voltage comes; and
control the first switch transistor to be turned off when the seventh switch transistor is completely turned off, wherein:
the first time instant of the positive half cycle of the output voltage is an n-th intersection time instant of a positive half wave of a modulation wave and a carrier wave, the second time instant of the positive half cycle of the output voltage is a time instant which is a first duration earlier than an (n+1)-th intersection time instant of the positive half wave of the modulation wave and the carrier wave; and
the first duration is greater than or equal to a turned-off duration of the seventh switch transistor; and
a second control module configured to:
for a negative half cycle of each output voltage, control the third switch transistor, the fourth switch transistor and the fifth switch transistor to be turned on when a first time instant of the negative half cycle of the output voltage comes;
control the eighth switch transistor to be turned on when the fourth switch transistor is completely turned on;
control the eighth switch transistor to be turned off when a second time instant of the negative half cycle of the output voltage comes; and
control the fourth switch transistor in response to be turned off when the eighth switch transistor is completely turned off,
wherein:
the first time instant of the negative half cycle of the output voltage is an n-th intersection time instant of a negative half wave of the modulation wave and the carrier wave;
the second time instant of the negative half cycle of the output voltage is a time instant which is a second duration earlier than an (n+1)-th intersection time instant of the negative half wave of the modulation wave and the carrier wave;
the second duration is greater than or equal to a turned-off duration of the eighth switch transistor; and
n is an odd number greater than or equal to 1.

2. A device for controlling an inverter,
the inverter including a three-level active clamped topology, wherein the three-level active clamped topology includes a first bus capacitor, a second bus capacitor and an inverter circuit; the first bus capacitor and the second bus capacitor are connected in series between a positive direct current bus and a negative direct current bus and a serial point of the first bus capacitor and the second bus capacitor is grounded; the inverter circuit includes a first switch transistor, a second switch transistor, a third switch transistor, a fourth switch transistor, a fifth switch transistor and a sixth switch transistor; the first switch transistor, the second switch transistor, the third switch transistor and the fourth switch transistor are sequentially connected in series between the positive direct current bus and the negative direct current bus in a same direction; the fifth switch transistor and the sixth switch transistor are connected in series to each other in a same direction, a non-control terminal in the fifth switch transistor not connected to the sixth switch transistor is connected to a serial point of the first switch transistor and the second switch transistor, a non-control terminal in the sixth switch transistor not connected to the fifth switch transistor is connected to a serial point of the third switch transistor and the fourth switch transistor, a serial point of the fifth switch transistor and the sixth switch transistor is connected to the serial point of the first bus capacitor and the second bus capacitor, and each of the switch transistors is anti-parallel connected to a corresponding diode; the inverter further includes a seventh switch transistor, an eighth switch transistor, a diode corresponding to the seventh switch transistor and a diode corresponding to the eighth switch transistor; the seventh switch transistor and the eighth switch transistor are connected in series between the positive direct current bus and the negative direct current bus in a same direction, and a serial point of the seventh switch transistor and the eighth switch transistor is connected to a serial point of the second switch transistor and the third switch transistor; and the seventh switch transistor and the eighth switch transistor are anti-parallel connected to the corresponding diodes respectively, the device comprising:

an operation mode determining module configured to determine a currently required operation mode of the inverter;

a searching module configured to search operation states of the switch transistors in the inverter corresponding to the determined operation mode, from a correspondence between operation modes of the inverter and operation states of the switch transistors in the inverter; and a first control module configured to control the operation states of the switch transistors in the inverter according to the searched operation states of the switch transistors in the inverter, wherein the correspondence between the operation modes of the inverter and the operation states of the switch transistors in the inverter comprises:

in a two-level mode, the first switch transistor, the second switch transistor, the third switch transistor, the fourth switch transistor, the fifth switch transistor and the sixth switch transistor are in a non-operation state, and the seventh switch transistor and the eighth switch transistor are in an operation state;

in a T-type three-level mode, the first switch transistor and the fourth switch transistor are in a non-operation state, and the second switch transistor, the third switch transistor, the fifth switch transistor, the sixth switch transistor, the seventh switch transistor and the eighth switch transistor are in an operation state;

in a three-level active clamped mode, the first switch transistor, the second switch transistor, the third switch transistor, the fourth switch transistor, the fifth switch transistor and the sixth switch transistor are in an operation state, and the seventh switch transistor and the eighth switch transistor are in a non-operation state; and in a mixed mode of the three-level active clamped mode and the T-type three-level mode, the first switch transistor, the second switch transistor, the third switch transistor, the fourth switch transistor, the fifth switch transistor, the sixth switch transistor, the seventh switch transistor and the eighth switch transistor are in an operation state;

an output load determining module configured to determine an output load of the inverter in a case that the operation mode determined by the operation mode determining module is the three-level active clamped mode; and a second control module configured to control the switch transistors by a modulation mode which is capable of achieving frequency multiplication of an output voltage if the determined output load is not greater than a set threshold; and control the switch transistors by other modulation mode if the determined output load is greater than the set threshold.

3. A method for controlling an inverter, the inverter including a three-level active clamped topology, wherein the three-level active clamped topology includes a first bus capacitor, a second bus capacitor and an inverter circuit; the first bus capacitor and the second bus capacitor are connected in series between a positive direct current bus and a negative direct current bus and a serial point of the first bus capacitor and the second bus capacitor is grounded; the inverter circuit includes a first switch transistor, a second switch transistor, a third switch transistor, a fourth switch transistor, a fifth switch transistor and a sixth switch transistor; the first switch transistor, the second switch transistor, the third switch transistor and the fourth switch transistor are sequentially connected in series between the positive direct current bus and the negative direct current bus in a same direction; the fifth switch transistor and the sixth switch transistor are connected in series to each other in a same direction, a non-control terminal in the fifth switch transistor not connected to the sixth switch transistor is connected to a serial point of the first switch transistor and the second switch transistor, a non-control terminal in the sixth switch transistor not connected to the fifth switch transistor is connected to a serial point of the third switch transistor and the fourth switch transistor, a serial point of the fifth switch transistor and the sixth switch transistor is connected to the serial point of the first bus capacitor and the second bus capacitor, and each of the switch transistors is anti-parallel connected to a corresponding diode; the inverter further includes a seventh switch transistor, an eighth switch transistor, a diode corresponding to the seventh switch transistor and a diode corresponding to the eighth switch transistor; the seventh switch transistor and the eighth switch transistor are connected in series between the positive direct current bus and the negative direct current bus in a same direction, and a serial point of the seventh switch transistor and the eighth switch transistor is connected to a serial point of the second switch transistor and the third switch transistor; and the seventh switch transistor and the eighth switch transistor are anti-parallel connected to the corresponding diodes respectively, the method comprising:

for a positive half cycle of each output voltage:
controlling the first switch transistor, the second switch transistor and the sixth switch transistor to be turned on when a first time instant of the positive half cycle of the output voltage comes;
controlling the seventh switch transistor to be turned on when the first switch transistor is completely turned on;
controlling the seventh switch transistor to be turned off when a second time instant of the positive half cycle of the output voltage comes; and
controlling the first switch transistor to be turned off when the seventh switch transistor is completely turned off; and for a negative half cycle of each output voltage:
controlling the third switch transistor, the fourth switch transistor and the fifth switch transistor to be turned on when a first time instant of the negative half cycle of the output voltage comes;
controlling the eighth switch transistor to be turned on when the fourth switch transistor is completely turned on;
controlling the eighth switch transistor to be turned off when a second time instant of the negative half cycle of the output voltage comes; and
controlling the fourth switch transistor to be turned off when the eighth switch transistor is completely turned off, wherein:
the first time instant of the positive half cycle of the output voltage is an n-th intersection time instant of a positive half wave of a modulation wave and a carrier wave;
the second time instant of the positive half cycle of the output voltage is a time instant which is a first duration earlier than an (n+1)-th intersection time instant of the positive half wave of the modulation wave and the carrier wave;
the first time instant of the negative half cycle of the output voltage is an n-th intersection time instant of a negative half wave of the modulation wave and the carrier wave;
the second time instant of the negative half cycle of the output voltage is a time instant which is a second duration earlier than an (n+1)-th intersection time instant of the negative half wave of the modulation wave and the carrier wave;
n is an odd number greater than or equal to 1;
the first duration is greater than or equal to a turned-off duration of the seventh switch transistor; and
the second duration is greater than or equal to a turned-off duration of the eighth switch transistor.

4. A method of controlling an inverter,
the inverter including a three-level active clamped topology, wherein the three-level active clamped topology includes a first bus capacitor, a second bus capacitor and an inverter circuit; the first bus capacitor and the second bus capacitor are connected in series between a positive direct current bus and a negative direct current bus and a serial point of the first bus capacitor and the second bus capacitor is grounded; the inverter circuit includes a first switch transistor, a second switch transistor, a third switch transistor, a fourth switch transistor, a fifth switch transistor and a sixth switch transistor; the first switch transistor, the second switch transistor, the third switch transistor and the fourth switch transistor are sequentially connected in series between the positive direct current bus and the negative direct current bus in a same direction; the fifth switch transistor and the sixth switch transistor are connected in series to each other in a same direction, a non-control terminal in the fifth switch transistor not connected to the sixth switch transistor is connected to a serial point of the first switch transistor and the second switch transistor, a non-control terminal in the sixth switch transistor not connected to the fifth switch transistor is connected to a serial point of the third switch transistor and the fourth switch transistor, a serial point of the fifth switch transistor and the sixth switch transistor is connected to the serial point of the first bus capacitor and the second bus capacitor, and each of the switch transistors is anti-parallel connected to a corresponding diode; the inverter further includes a seventh switch transistor, an eighth switch transistor, a diode corresponding to the seventh switch transistor and a diode corresponding to the eighth switch transistor; the seventh switch transistor and the eighth switch transistor are connected in series between the positive direct current bus and the negative direct current bus in a same direction, and a serial point of the seventh switch transistor and the eighth switch transistor is connected to a serial point of the second switch transistor and the third switch transistor; and the seventh switch transistor and the eighth switch transistor are anti-parallel connected to the corresponding diodes respectively, the method comprising:
determining a currently required operation mode of the inverter;
searching operation states of the switch transistors in the inverter corresponding to the determined operation mode, from a correspondence between operation modes of the inverter and operation states of the switch transistors in the inverter; and
controlling the operation states of the switch transistors in the inverter according to the searched operation states of the switch transistors in the inverter,
wherein the correspondence between the operation modes of the inverter and the operation states of the switch transistors in the inverter comprises:
in a two-level mode, the first switch transistor, the second switch transistor, the third switch transistor, the fourth switch transistor, the fifth switch transistor and the sixth switch transistor are in a non-operation state, and the seventh switch transistor and the eighth switch transistor are in an operation state;
in a T-type three-level mode, the first switch transistor and the fourth switch transistor are in a non-operation state, and the second switch transistor, the third switch transistor, the fifth switch transistor, the sixth switch transistor, the seventh switch transistor and the eighth switch transistor are in an operation state;
in a three-level active clamped mode, the first switch transistor, the second switch transistor, the third switch transistor, the fourth switch transistor, the fifth switch transistor and the sixth switch transistor are in an operation state, and the seventh switch transistor and the eighth switch transistor are in a non-operation state; and
in a mixed mode of the three-level active clamped mode and the T-type three-level mode, the first switch transistor, the second switch transistor, the third switch transistor, the fourth switch transistor, the fifth switch transistor, the sixth switch transistor, the seventh switch transistor and the eighth switch transistor are in an operation state; and in a case that the determined operation mode is the three-level active clamped mode:
determining an output load of the inverter; and
controlling the switch transistors by a modulation mode which is capable of achieving frequency multiplication of an output voltage, if the determined output load is not greater than a set threshold; and controlling the switch transistors by other modulation mode if the determined output load is greater than the set threshold.

5. The method according to claim 4, wherein the other modulation mode is one of a Sinusoidal Pulse Width Modulation (SPWM) and a Parallel-Freewheeling Sinusoidal Pulse Width Modulation (PF-SPWM) mode.

6. The method according to claim 4, wherein the modulation mode is one of a Double-Frequency Sinusoidal Pulse Width Modulation (DF-SPWM) and a Parallel-Freewheeling Double-Frequency Sinusoidal Pulse Width Modulation (PFDF-SPWM) mode.

7. The method according to claim 6, wherein the other modulation mode is one of a Sinusoidal Pulse Width Modulation (SPWM) and a Parallel-Freewheeling Sinusoidal Pulse Width Modulation (PF-SPWM) mode.

8. A method for controlling an inverter,
the inverter including first and second bus capacitors, first, second, third, fourth, fifth, sixth, seventh, and eighth switches, and first, second, third, fourth, fifth, sixth, seventh, and eighth diodes,
the first bus capacitor being connected between a ground terminal and a positive direct current bus,
the second bus capacitor being connected between the ground terminal and a negative direct current bus,
each diode of the eight diodes being connected antiparallel to a respective one of the eight switches,
the first switch being connected between the positive direct current bus and a first node,
the second switch being connected between the first node and an output of the inverter,
the third switch being connected between the output of the inverter and a second node,
the fourth switch being connected between the second node and the negative direct current bus,
the fifth switch being connected between the first node and the ground terminal,
the sixth switch being connected between the ground terminal and the second node,
the seventh switch being connected between the positive direct current bus and the output of the inverter, and
the eighth switch being connected between the output of the inverter and the negative direct current bus,
the method comprising:
while the output of the inverter is at a higher potential than the ground terminal:
identifying intersection events between a modulation wave and a carrier wave,
in response to a first event of the intersection events, energizing the first switch;
in response to the first switch turning on completely, energizing the seventh switch;
at a first time, de-energizing the seventh switch, wherein the first time precedes a second event of the intersection events by a first predetermined advance, wherein the first predetermined advance is greater than or equal to a turn-off delay of the seventh switch, and wherein the second event is immediately subsequent to the first event with no intervening intersection events; and
in response to the seventh switch turning off completely, de-energizing the first switch; and
while the output of the inverter is at a lower potential than the ground terminal:
identifying intersection events between the modulation wave and the carrier wave,
in response to a third event of the intersection events, energizing the fourth switch;
in response to the fourth switch turning on completely, energizing the eighth switch;
at a second time, de-energizing the eighth switch, wherein the second time precedes a fourth event of the intersection events by a second predetermined advance, wherein the second predetermined advance is greater than or equal to a turn-off delay of the eighth switch, and wherein the fourth event is immediately subsequent to the third event with no intervening intersection events; and
in response to the eighth switch turning off completely, de-energizing the fourth switch.

9. The method of claim 8, further comprising:
while the output of the inverter is at a higher potential than the ground terminal and in response to the first event of the intersection events, energizing the second switch and the sixth switch.

10. The method of claim 8, further comprising:
while the output of the inverter is at a lower potential than the ground terminal and in response to the third event of the intersection events, energizing the third switch and the fifth switch.

* * * * *